United States Patent [19]

Chechovsky et al.

[11] Patent Number: 4,592,218

[45] Date of Patent: Jun. 3, 1986

[54] TANK CLOSURE LOCK

[76] Inventors: Dardis W. Chechovsky, P.O. Box 855, Lenoir City, Tenn. 37771; Jackie D. Rikard, P.O. Box 534, Hardy, Ark. 72542

[21] Appl. No.: 709,339

[22] Filed: Mar. 7, 1985

[51] Int. Cl.[4] .............................................. B65D 55/14

[52] U.S. Cl. .......................................... 70/164; 70/19

[58] Field of Search ................. 70/158, 159, 160, 161, 70/162, 163, 164, 165, 166, 167, 168, 169, 170, 171, 172, 173, 19, 57, 58, 59, 60, 61, 62; 220/210

[56] References Cited

U.S. PATENT DOCUMENTS 1,789,492 1/1931 Nisbett ................................ 70/170
1,794,386 3/1931 Miller .................................. 70/171
1,995,997 3/1935 Morris ................................. 70/168
3,987,653 10/1976 Lyon ................................... 70/19

*Primary Examiner*—Robert L. Wolfe
*Attorney, Agent, or Firm*—B. P. Fishburne, Jr.

[57] ABSTRACT

A closure lock to discourage theft of fuel from tanks is disclosed. A lock body is threadedly engaged with a tank closure cap and contains a key-operated eccentric which is biased toward a grip or locking position with a cable extending through a passage in the lock body and being secured to a locking bar which bridges the lower end of a splash sleeve within the tank adjacent to the tank filling opening. Releasing of the cable allows the cable and locking bar to drop to a position within the tank whereby the tank closure cap can be removed.

8 Claims, 5 Drawing Figures

TANK CLOSURE LOCK

BACKGROUND OF THE INVENTION

Stealing of fuel from the fuel tanks of large trucks and the like is a serious problem, given the high cost of diesel fuel and gasoline. Lockable tank closure devices are known in the prior art but, generally speaking, are too complicated and costly to be feasible. Furthermore, in many cases, the locking arrangements are applicable to only one style of tank and their use may require a specially designed closure cap.

Accordingly, a major object of this invention is to provide a lock for fuel tank closures and the like which is readily adaptable to almost any existing equipment and requires only the formation by drilling of a single opening in the existing tank cap in order to install the locking device according to the present invention. In essence, the locking device is universal in terms of its adaptability to virtually all types of tanks and tank closures. While the invention is particularly suitable for use on large truck fuel tanks, it is also useful on stationary tanks, rail cars, boats and the like.

Another important object of the invention is to provide a locking device of the above-mentioned character which is easily adjustable to accommodate various installations, which is simplified, and composed of a few relatively inexpensive components.

Still another object of the invention is to provide a locking device of the character mentioned which is easy to install, convenient to operate and secure in its locking capability.

Other features and advantages of the invention will become apparent to those skilled in the art during the course of the following detailed description.

DETAILED DESCRIPTION

Figures 1, 2, 5:
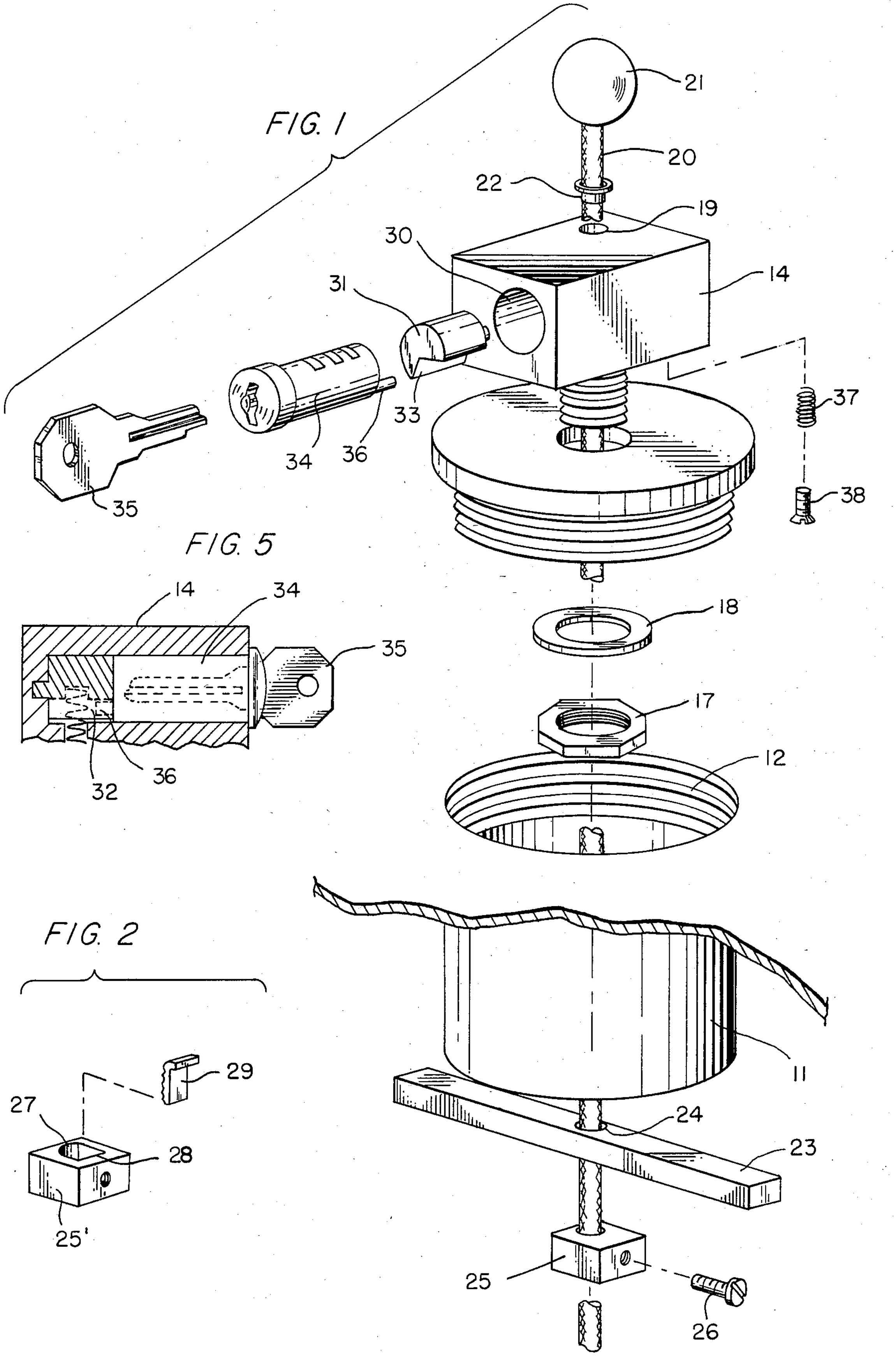
FIG. 1 is an exploded perspective view of a tank closure lock according to the present invention.
FIG. 2 is an exploded perspective view showing a variant of the invention.
FIG. 5 is a fragmentary vertical section taken substantially on line 5—5 of FIG. 3.

Referring to the drawings in detail wherein like numerals designate like parts, a tank, such as the fuel tank of a truck, includes a top wall 10 having an opening within which is fixed a depending splash sleeve 11. At its top, the splash sleeve 11 has internal screw-threads 12 which receive a threaded tank closure cap 13 of a conventional type.

A locking device for the cap 13 according to the invention comprises a block-like body 14 immediately above and bearing on the top of the cap 13 and having an integral depending externally screw-threaded tubular extension 15 received through a single drilled opening 16 formed centrally in the cap 13. The body 14 is secured to the closure cap 13, by a locking nut 17 and seal 18 applied to the threaded extension 15 beneath the top wall of the cap 13, as shown in the drawings.

The body 14 has a through bore 19 which is coaxial with the bore of tubular extension 15 and this bore receives a locking cable 20 having an upper end knob or handle 21 for convenience of operation. A cable seal 22 is also provided at the top of the block-like body 14.

Below the lower end of the splash sleeve 11 a rigid locking bar 23 receives the cable through a center opening 24 thereof, and below the locking bar 23 a cable adjuster in the form of a set collar 25 having a set screw 26 is applied to the cable, as shown.

As shown in FIG. 2, a variant of the cable adjuster comprises a set collar 25' having a cable receiving opening 27 which includes one flat wall 28. A cable engaging wedge or key 29 is installed adjacent to the flat wall 28 and is engaged by the set screw 26 to force the element 29 into tight gripping engagement with the cable 20 to lock the same relative to the bar 23 at the proper length of cable to accommodate a particular installation of the invention.

Figure 4:
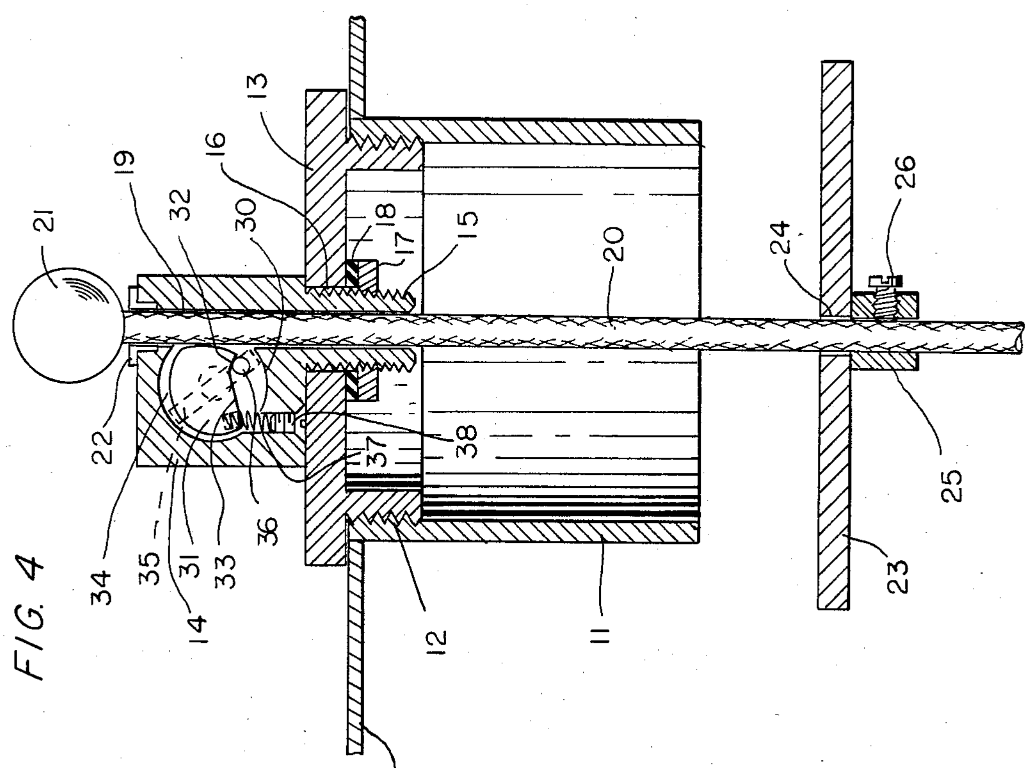
FIG. 4 is a similar view of the lock in a released position.
Figure 3:
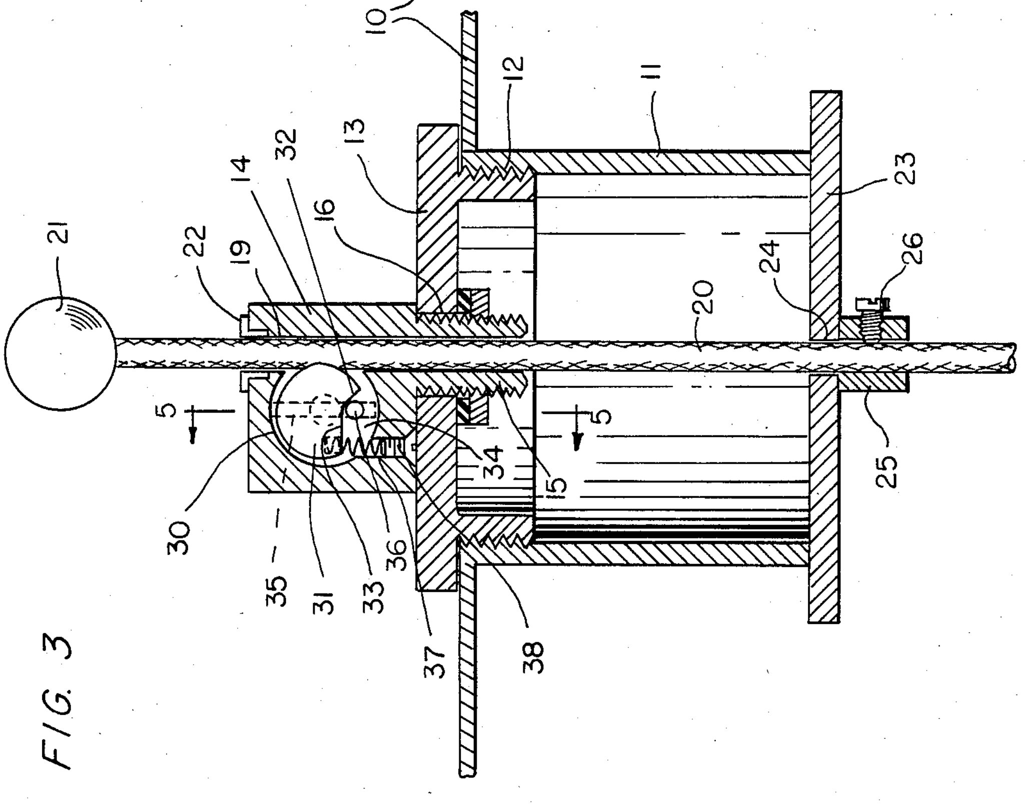
FIG. 3 is a central vertical section taken through the closure lock in the assembled active locking position.

The body 14 has a cross bore 30 at right angles to the bore 19 and intersecting the latter bore within the body portion, as shown in FIGS. 3 and 4. A rotary cable gripping and locking eccentric 31 is installed in the bore 30 and is adapted to engage one side of the cable 20 to releasably clamp the cable between the eccentric 31 and the bore 19, as shown in FIG. 3. The eccentric 31 is recessed in its lower side to form a short shoulder surface 32 and a longer shoulder surface 33 arranged at an obtuse angle to the surface 32. The bore 30 is a blind bore closed at one end.

A key-operated tumbler lock 34 is installed in the bore 30 behind the eccentric 31 and a proper key 35 to operate the lock 34 is provided.

At its leading end, the lock 34 carries a projecting pin 36 which enters the recess of the eccentric 31 and is adapted to engage the shoulder surface 32 of the eccentric to rotate the eccentric to a cable unlocking position, FIG. 4, when the key 35 is employed to turn the lock 34.

A compression spring 37 held in a small bore in the bottom face of the body 14 by a screw 38 bears on the shoulder surface 33 of the eccentric 31 and biases the eccentric to a cable gripping or locking position as depicted in FIG. 3.

With the bar 23 properly adjusted on the cable 20, the cable is pulled upwardly until the bar 23 engages the bottom end of sleeve 11. The spring 37 will yield and the eccentric 31 will rotate counterclockwise to allow the pulling up of the cable to the locking position shown in FIG. 3. Upon release of the cable in its position shown in FIG. 3, the eccentric 31 will be biased by the spring 37 into gripping or locking engagement with the cable 20 and any attempt by an unauthorized person without the key 35 to remove the threaded cap 13 will be defeated. This is true because any upward movement of the cap 13 along the cable 20, which is locked by the bar 23, will induce rotation of the eccentric 31 in the clockwise direction, FIG. 3, and this will cause the eccentric to grip the cable ever more tightly as the cap 13 and body 14 attempt to rise.

In order to unlock the cap 13 for ready removal by an authorized person, the key 35 is inserted into the lock 34 and the lock is turned counterclockwise, FIG. 4, and its pin 36 acting on the shoulder 32 will rotate the eccentric 31 sufficiently far against the force of spring 37 to release the cable 20, whereupon the cable and bar 23 can drop to the position shown in FIG. 4. In this unlocked position, the knob 21 rests on the body 14 and the bar 23 is spaced sufficiently below the sleeve 11 to permit easy removal of the closure cap 13 from the top of the sleeve 11.

To relock the cap 13 following removal of the key 35, the cable 20 is pulled up until the bar 23 engages the bottom of sleeve 11, whereupon the cap 13 can be threaded into the sleeve 11 and the device is returned to the locking state shown in FIG. 3.

The mechanism is reliable, secure, easy to operate and inexpensive. Its convenience and advantages should now be apparent to those skilled in the art.

It is to be understood that the form of the invention herewith shown and described is to be taken as a preferred example of the same, and that various changes in the shape, size and arrangement of parts may be resorted to, without departing from the spirit of the invention or scope of the subjoined claims.

We claim:

1. A tank closure lock comprising a removable tank closure cap having an opening formed therethrough, a body portion seated on the closure cap and having a depending tubular extension projecting through said opening of the closure cap, means to secure said extension within said opening and being engaged with the bottom surface of the closure cap, said body portion having a first bore formed therethrough from top to bottom and being coaxial with the bore of said tubular extension and having a second bore formed partly therethrough at right angles to the first bore and intersecting the first bore, a cable element extending movably through the first bore and said tubular extension and having a pulling handle means thereon above said body portion, a locking cross bar adjustably secured to the cable below the closure cap and being adapted to transversely bridge and engage the lower end of a splash sleeve within a tank on which the lock is installed, a rotary eccentric disposed in said second bore of the body portion and having a recess defining thereon first and second shoulders, a key-operated tumbler lock installed in the second bare behind said eccentric and having a forwardly projecting pin adapted to engage the first shoulder of the eccentric when the lock is turned by a key, and a biasing spring held on the body portion and bearing on the second shoulder of the eccentric to bias the eccentric toward gripping and locking engagement with the cable element.

2. A tank closure lock as defined in claim 1, and said depending tubular extension being screw-threaded, and said means to secure said extension comprising a locking nut and an elastic seal disposed between said nut and the bottom surface of the closure cap.

3. A tank closure lock as defined in claim 1, and said locking cross bar having an opening formed therethrough receiving said cable element adjustably, and a set collar adjustably secured to said cable beneath the locking cross bar and being engageable with the bottom of said cross bar.

4. A tank closure lock comprising a body portion having first and second intersecting substantially perpendicular bores and having a threaded tubular extension depending from its bottom adapted to enter an opening of a tank closure element, means to releasably secure said extension in said opening of a tank closure element, a cable element extending movably through the first bore and tubular extension and having a handle means on one end thereof, a locking cross bar adjustably secured to the cable element in spaced relation to said handle means, and a rotary key-operated eccentric means mounted in a second bore of said body portion and adapted when turned in one direction to exert increasing gripping pressure on one side of the cable element and to release the cable element when turned in the opposite direction.

5. A tank closure lock as defined in claim 4, and resilient means on the body portion engaging the eccentric means and biasing it in the direction to exert said gripping pressure on said cable element.

6. A tank closure lock as defined in claim 5, and said eccentric means comprising a rotary eccentric element in said second bore and a separately formed key-operated rotary lock in said second bore behind the eccentric element and having a part drivingly engaging the eccentric element to turn it in one direction.

7. A tank closure lock comprising a body portion adapted to be fixed to the top of a tank closure element and having a first bore adapted to receive therethrough movably a strong flexible element, a locking cross bar adjustably fixed on the strong flexible element in spaced relationship to said body portion and a key-operated releasable rotary eccentric gripping device on the body portion and being resiliently biased toward gripping engagement with said strong flexible element.

8. A tank closure lock as defined in claim 7, and a pulling handle element on the strong flexible element near its end away from said cross bar.

* * * * *